United States Patent
Bujeau et al.

(10) Patent No.: US 9,162,687 B2
(45) Date of Patent: Oct. 20, 2015

(54) MEMBRANE FOR SECONDARY AIR SUSPENSION OF A LAND OR RAIL VEHICLE, METHOD OF MANUFACTURING SAME, ITS SUSPENSION AND VEHICLE INCORPORATING SAME

(75) Inventors: Benjamin Bujeau, La Selle en Hermois (FR); Victor Zarife, Cepoy (FR)

(73) Assignee: Hutchinson S.A., Paris (FR)

( * ) Notice: Subject to any disclaimer, the term of this patent is extended or adjusted under 35 U.S.C. 154(b) by 118 days.

(21) Appl. No.: 13/427,445

(22) Filed: Mar. 22, 2012

(65) Prior Publication Data
US 2012/0240817 A1 Sep. 27, 2012

(30) Foreign Application Priority Data
Mar. 24, 2011 (FR) ...................................... 11 52452

(51) Int. Cl.
*B61F 5/10* (2006.01)
*F16F 9/04* (2006.01)
*B29D 22/02* (2006.01)

(52) U.S. Cl.
CPC ................ *B61F 5/10* (2013.01); *B29D 22/023* (2013.01); *F16F 9/0409* (2013.01); *F16F 9/0427* (2013.01); *F16F 9/0454* (2013.01); *F16F 9/0445* (2013.01)

(58) Field of Classification Search
CPC ..... F61F 9/0409; F61F 9/0418; F61F 9/0427; F61F 9/0445; F61F 9/0454; F61F 9/0463; B61F 5/10
USPC .................... 105/453; 280/124.162, 124.157, 280/124.158; 267/35, 64.11, 64.23, 64.24, 267/63.27; 156/166, 169
See application file for complete search history.

(56) References Cited

U.S. PATENT DOCUMENTS

| | | | | |
|---|---|---|---|---|
| 539,224 A | * | 5/1895 | Huss | 442/328 |
| 558,689 A | * | 4/1896 | Huestis | 152/453 |
| 885,219 A | * | 4/1908 | Bayne et al. | 138/130 |
| 1,026,836 A | * | 5/1912 | Subers | 152/556 |
| 1,123,375 A | * | 1/1915 | Raymond | 442/104 |
| 1,149,841 A | * | 8/1915 | Latour et al. | 152/556 |

(Continued)

FOREIGN PATENT DOCUMENTS

| | | |
|---|---|---|
| DE | 39 37 819 | 5/1991 |
| EP | 1 484 525 | 12/2004 |

(Continued)

OTHER PUBLICATIONS

Search Report for FR application No. 1152452 dated Nov. 2, 2011.

*Primary Examiner* — Zachary Kuhfuss
(74) *Attorney, Agent, or Firm* — Morgan, Lewis & Bockius LLP

(57) ABSTRACT

The present invention relates to a membrane for secondary air suspension of a land or rail vehicle, in particular of heavy truck or passenger wagon type, this secondary suspension incorporating it, such a vehicle which is provided therewith, and the method for manufacturing this membrane.

This substantially toroidal membrane (103) comprises two attachment areas (110) and at least one corded layer (106) of fabric and/or metallic threads which is situated between two radially internal (104) and external (105) elastomer layers and which extends between these attachment areas.

According to the invention, said at least one corded layer has its or each of its thread(s) individually sheathed by an elastomer sheath compatible with the internal and external layers.

17 Claims, 4 Drawing Sheets

(56) References Cited

U.S. PATENT DOCUMENTS

| | | | | |
|---|---|---|---|---|
| 1,355,986 | A | * | 10/1920 | Lister .............................. 152/453 |
| 1,369,273 | A | * | 2/1921 | Eves ................................. 57/234 |
| 1,478,833 | A | * | 12/1923 | O'Brien ........................ 152/549 |
| 1,575,955 | A | * | 3/1926 | Whittier ........................ 152/556 |
| 1,641,792 | A | * | 9/1927 | Trotter .......................... 152/549 |
| 1,992,665 | A | * | 2/1935 | Eardley ......................... 428/114 |
| 3,666,598 | A | | 5/1972 | Christie et al. |
| 4,724,881 | A | * | 2/1988 | Poque et al. .................. 152/527 |
| 4,763,883 | A | * | 8/1988 | Crabtree ................... 267/64.27 |
| 5,566,929 | A | * | 10/1996 | Thurow ..................... 267/64.24 |
| 6,264,178 | B1 | | 7/2001 | Schisler et al. |
| 6,786,476 | B1 | | 9/2004 | Kerstetter, III et al. |
| 2004/0041313 | A1 | | 3/2004 | Crabtree |
| 2005/0205191 | A1 | * | 9/2005 | Suzuki .......................... 152/537 |
| 2007/0205545 | A1 | * | 9/2007 | Thurow et al. ............. 267/64.24 |
| 2008/0111288 | A1 | | 5/2008 | Howard et al. |
| 2010/0276051 | A1 | * | 11/2010 | Kanehira ...................... 152/458 |

FOREIGN PATENT DOCUMENTS

| | | |
|---|---|---|
| EP | 1 918 609 | 5/2008 |
| FR | 1 165 381 | 1/1957 |
| FR | 2 896 220 | 7/2007 |

\* cited by examiner

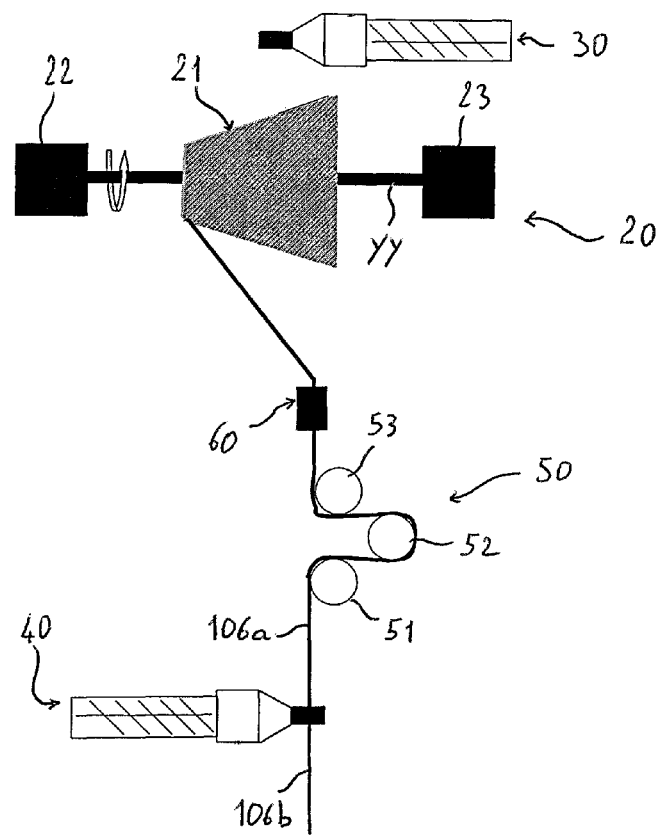
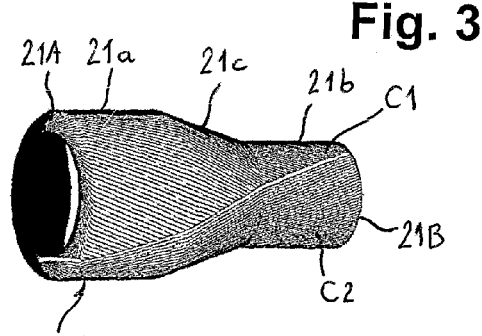
Fig. 4
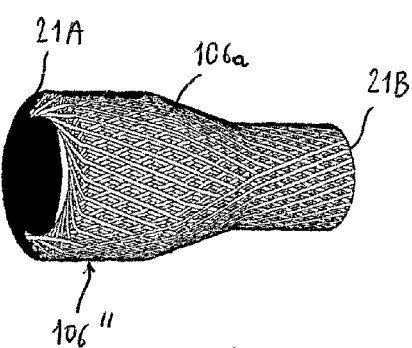
Fig. 5

MEMBRANE FOR SECONDARY AIR SUSPENSION OF A LAND OR RAIL VEHICLE, METHOD OF MANUFACTURING SAME, ITS SUSPENSION AND VEHICLE INCORPORATING SAME

RELATED APPLICATIONS

The present application is based on and claims the benefit of French Patent Application No. 1152452 (filed Mar. 24, 2011) which is hereby incorporated by reference in its entirety.

FIELD OF THE INVENTION

The present invention relates to a membrane for secondary air suspension of a land or rail vehicle, in particular of heavy truck or passenger wagon type, this secondary suspension incorporating it, such a vehicle which is provided therewith, and a method for manufacturing this membrane.

BACKGROUND OF THE INVENTION

Generally, a passenger car body for a rail vehicle is supported by two bogies respectively situated toward the two ends of the body. Each bogie generally comprises two axles, and each bogie is linked on the one hand to each axle by a primary suspension device with helical springs for example, and on the other hand to the body of the car by two secondary air suspension devices which are each associated, for reasons of safety, to an emergency device suitable for compensating any leak of air in the associated secondary suspension and which could possibly provoke a derailing of the rail vehicle running at high speed.

The role of these secondary air suspensions is essentially to improve the comfort of the passengers, and they therefore have to offer a very wide flexibility. Physically, a secondary air suspension consists of a flexible and air-tight membrane, which can take the form of a tire linked to an auxiliary air tank to increase the volume of air stored in the membrane. The document FR-A1-2 896 220 can, for example, be cited for the description of such a secondary air suspension.

As is known, these secondary air suspension membranes are reinforced by sheets of woven textile fabrics (inlaid textiles) which are embedded in rubber, as for example described in the document EP-A1-1 918 609 which mentions such textile/rubber composite fabrics and as illustrated in FIG. 8 appended to the present description which shows a phase of forming, on a mandrel a, of a woven sheet b of such a known membrane. As can be seen in this FIG. 8 which also shows two rods c provided to reinforce two attachment areas of the membrane and between which the sheet b is intended to extend, the latter comprises warp threads b1 which extend substantially in the axial direction YY of the mandrel a and which are linked together by weft threads b2 which extend substantially in the circumferential direction of the mandrel a. It can also be seen in this FIG. 8 that the duly formed woven sheet b necessarily has an overall axial area of overlap b3 (known as "duplicature" to those skilled in the art) defining two thicknesses of this sheet b at its connection around the mandrel a.

A major drawback with these known membranes with woven fabric sheets lies in their relatively low mechanical strength in operation. In particular, the doubling of the density of threads b1, b2 in this area b3 constitutes an obstacle to the uniform expansion of the membrane when inflating the membrane preform before vulcanization, which generates a line of mechanical weakness of the membrane in use.

SUMMARY OF THE INVENTION

One aim of the invention is to propose a substantially toroidal membrane for secondary air suspension of a land or rail vehicle, the membrane comprising two attachment areas and at least one corded layer of fabric and/or metallic threads which is situated between two radially internal and external elastomer layers and which extends between these attachment areas, which in particular remedies this drawback.

To this end, a membrane according to the invention is such that said at least one corded layer has its or each of its thread (s) individually sheathed by an elastomer sheath compatible with these internal and external layers.

It will be noted that this membrane according to the invention has an asymmetrical geometry, seen in axial section (i.e. in transversal section in a plane perpendicular to the circumferential direction of the membrane), unlike the tires, with, for this membrane, a circumferential bead which extends asymmetrically between its two attachment areas by being inclined axially toward one of these areas.

According to another feature of the invention, this membrane is such that said or each corded layer has no discontinuity between said attachment areas, in particular having no area of overlap of this layer by itself extending from one of the attachment areas to the other.

It will be noted that this absence of discontinuity from one attachment area to the other, such that the area of overlap or "duplicature" mentioned above in relation to the woven sheet of the prior art, eliminates any line of mechanical weakness for the membrane generated by an expansion defect of such an area during inflation of the membrane, as explained above.

According to another aspect of the invention, said or each corded layer has no weft thread, unlike these woven sheet membranes of the prior art.

Advantageously, this sheath can be extruded around this/ these thread(s) and can have a thickness of between 0.1 mm and 1 mm.

According to another feature of the invention, said or each sheathed thread can form a winding of adjacent turns in said at least one corded layer. In other words, in the case where the membrane comprises a single corded layer, the latter can have adjacent turns and, in the case where the membrane comprises a number of radially superposed corded layers, at least one of these layers can have adjacent turns. However, according to a variant of the invention, the corded layer(s) may not have adjacent turns, which means that it is possible to have no corded layer with adjacent turns in the membrane.

It will be noted that this individual sheath of thread which coats the turns of said or each thread is not the same as the coating of rubber in which the two sides of a woven textile fabric are embedded according to the prior art.

It will also be noted that this sheath makes it possible, on the one hand, to improve the "crude bonding" of the wound thread when forming the non-cross-linked membrane preform on a mandrel with enhanced control of the trajectory or inclination of this thread and, on the other hand, to minimize the wear-resistance in operation of the cross-linked membrane despite the preferably adjacent nature of the turns of the corded winding.

Advantageously, the membrane may comprise a number, and preferably 2n (n being an integer ≥1) said corded layers radially superposed, each of which comprises a sheathed textile cord forming said or each thread and preferably at least partly made of a polyamide such as aramid and/or of a polyester such as PET. These corded layers may be formed by a continuous winding of a single said sheathed textile cord according to angles +α, −α with the axis of revolution of the membrane which balance out overall with one and the same number of turns of angle +α and of angle −α, with α preferably being between 0° and 90°.

It will be noted that it is possible to use a number of materials for the sheathed thread(s) of the or each corded layer (e.g., a number of textile materials within one and the same corded layer, such as, for example, PET and aramid), said corded layer then having a hybrid structure.

Furthermore, and optionally in the case where at least one of the corded layers has this hybrid structure, it is possible to use different thread materials from one corded layer to another one topping it directly or not.

Even more advantageously, said corded layers may mutually overlap so that the sheathed thread of one of these layers entirely covers that of the underlying layer, or else cross so that the respective sheathed threads of these layers are interlaced at regular intervals in the manner of a woven fabric.

According to another feature of the invention, said or each thread may be covered by an adhesion activator at its interface with said sheath that it includes, this activator preferably being a resorcinol formaldehyde resin (RFL for short) or a methylol donor (e.g. hexamethoxymelamine or hexamethylenetetramine).

Advantageously, said sheath may consist of a cross-linked elastomer composition which is based on at least one rubber or thermoplastic elastomer (TPE), just like the internal and external layers, but which is different from that of these two layers, this sheath preferably having a thickness of between 0.1 mm and 1 mm.

It will be noted that this sheath makes it possible to improve the bond between the two internal and external layers, but that it should not be too thick so as not to penalize the desired density of threads which should be as high as possible. This sheath thickness is chosen according to the nature of the thread (in particular its mechanical strength) and the density of threads necessary for the good reinforcement of the membrane.

Also advantageously, said compositions of sheath and of internal and external layers may be based on at least one halogenated or non-halogenated dienic elastomer, preferably chosen from the group consisting of polychloroprenes (CR), polybutadienes (BR), styrene-butadiene copolymers (SBR), polyisoprenes (IR), natural rubber (NR), ethylene-propylenediene terpolymers (EPDM) and their mixtures, these compositions also comprising a reinforcing filler preferably based on carbon black and/or a mineral filler such as a silicon oxide. As a variant, these compositions of sheath and of internal and external layers may be based on at least one thermoplastic vulcanizate (TPV) as thermoplastic elastomer, it being understood that other TPE can be used.

According to another feature of the invention, said attachment areas of the membrane may be respectively reinforced by two rods which may consist of said thread(s) circumferentially in extension of said at least one corded layer, these rods then being able to advantageously consist of the above-mentioned textile cord, thus being non-metallic unlike the rods of the existing air membranes.

A secondary air suspension of a land or rail vehicle according to the invention, the vehicle comprising a body supported by at least one wheel train, comprises:
an auxiliary air tank mounted under the body, and
a substantially toroidal membrane as defined above which is mounted under this tank by communicating with it and which comprises two upper and lower attachment areas mounted against two upper and lower support plates respectively intended to be mounted under this tank and on an emergency suspension attached to the wheel train.

A land or rail vehicle according to the invention, in particular a heavy truck or a passenger wagon, is supported by at least one wheel train and is equipped with at least one secondary air suspension as defined above.

A manufacturing method according to the invention for manufacturing a membrane as mentioned above comprises the following steps:

a) winding around a forming mandrel of said at least one thread, previously sheathed, preferably by extrusion, radially on the outside of said internal layer to form said at least one corded layer, b) deposition of said external layer radially on the outside of said at least one thus wound corded layer to obtain a preform of a cross-linkable membrane gripping this mandrel, and c) molding and cross-linking under pressure of this preform in a press.

It will be noted that the deposition of the internal and external layers can be carried out in the form of sheets or of a winding of extruded strips, as nonlimiting examples, and that it is possible to deposit a number of internal and/or external layers, replacing a single internal and/or external layer.

Advantageously, said winding of the step a) can be obtained by a deposition of a single continuous and sheathed said thread, deposited on several, and preferably 2n (n≥1) said corded layers and consisting of a textile cord treated by an adhesion activator and sheathed by a composition preferably based on a halogenated or non-halogenated dienic elastomer, such as those mentioned above.

According to another feature of the invention, this method may comprise, in the step a), the winding of said single continuous sheathed thread on said corded layers according to angles +α, −α with the axial direction of the mandrel and which balance out overall with one and the same number of turns of angle +α and −α preferably between ±0° and 90°.

Advantageously, it is possible to implement the step a) by displacing said mandrel optionally in translation and rotation relative to its axis of symmetry to produce said winding, this mandrel having, for example, two cylindrical axial end sections linked together by an intermediate section that is, for example, tapered, such that said attachment areas of the preform of the membrane are formed at the respective ends of the mandrel.

BRIEF DESCRIPTION OF FIGURES

Other advantages and features and details of the invention will emerge from the following further description, with reference to the appended drawings, given solely as examples and in which:

FIG. 3 is a schematic view of an installation for forming a membrane preform according to the invention, FIG. 4 is a perspective view with partial cutaway of a first exemplary membrane reinforcement with superposed layers of sheathed threads entirely overlapping, FIG. 5 is a perspective view of second exemplary membrane reinforcement with superposed layers of sheathed threads which are interlaced between these layers in the manner of a woven fabric.

DETAILED DESCRIPTION OF THE INVENTION

Figure 1:
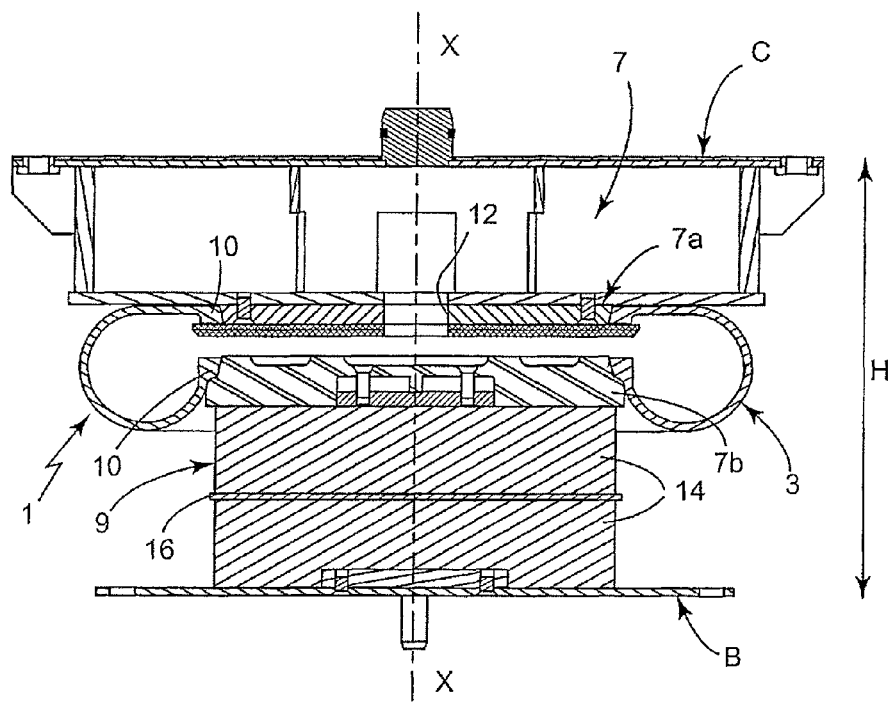
FIG. 1 is an axial cross-sectional view of an exemplary secondary air suspension for a rail vehicle according to the invention.

The secondary air suspension 1 as illustrated in FIG. 1 consists of a flexible, deformable and airtight membrane 3 that has an overall toroidal form of a tire (i.e., an axial section substantially "Ω" shaped, like a tire, although asymmetrical unlike said tire), and an auxiliary air tank 7 connected to the membrane 3. The secondary suspension 1 is associated with an emergency suspension 9 capable of compensating any air leak in the membrane 3. The secondary suspension 1 and the emergency suspension 9 are superposed one on top of the other by being aligned on a substantially vertical axis of revolution X-X, and have a symmetry of revolution about this axis X-X.

The membrane 3 has two attachment areas 10 which, in the example of FIG. 1, have substantially the same diameter and which are respectively mounted on the peripheral rim of two circular upper 7a and lower 7b metal support plates situated facing one another. The auxiliary tank 7 is fixed above the membrane 3 on the upper support plate 7a and communicates with the interior of the membrane 3 through a passage 12. The emergency suspension 9 is fixed under the membrane 3, and consists of two groups of springs 14 separated by a metal plate 16. The auxiliary tank 7 and the emergency suspension 9 are respectively fixed to the body C of the vehicle and to the bogie B which supports this vehicle.

Figure 2:
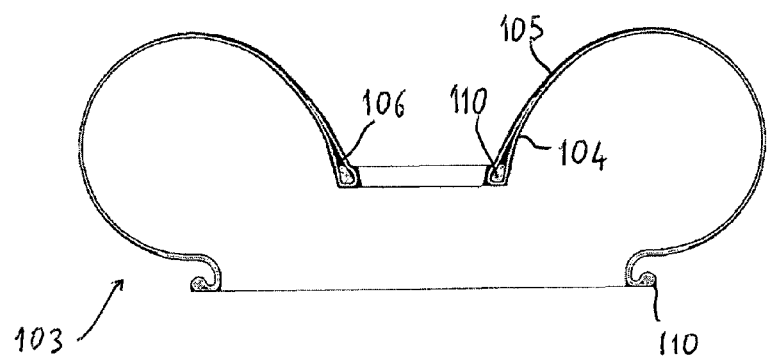
FIG. 2 is a schematic view in axial section of another exemplary membrane of the invention that can be used in the secondary suspension of FIG. 1.

It will be noted that the invention applies to different forms of membranes, such as, for example, the membrane 103 of FIG. 2 with attachment areas 110 of different diameters, a membrane 103 on which are identified the radially internal 104 and external 105 layers, both based on an elastomer, such as a dienic elastomer (e.g. a CR) or a TPV. As for the cord reinforcement 106 according to the invention, it is represented schematically in FIG. 2 (its corded layers not being visible) and will be described in detail below.

As illustrated in FIG. 3, it is possible to form a preform (not cross-linked) of the membrane 103 according to the invention, for example by means of an installation comprising:

a forming lathe 20 comprising a forming mandrel 21 which is for example partly tapered (its exact form is illustrated in FIGS. 4 and 5), which is mounted to move optionally in translation and in rotation about its axis of symmetry YY by control means 22, 23 and which is intended to receive the internal 104 and external 105 elastomer layers and, radially between these, the corded layers 106 based on sheathed thread(s) 106a, a first elastomer strip extruder 30 which is arranged in relation to the mandrel 21 so as to deposit thereon in succession windings of these strips forming the or each internal layer 104 then the or each external layer 105, and a second extruder 40 for individually sheathing the or each thread 106b that it receives and which is coupled to a tensioning device 50 (via rollers 51, 52, 53) and for depositing the sheathed thread 106a, the tension and the deposition in the form of a winding on the mandrel 21 being optionally driven for example by a winding device 60.

It will be noted that the successive deposition on the mandrel 21 of the windings of the internal 104, corded 106 with sheathed thread(s) 106a and external 105 layers can be carried out manually or else at least partly automatically by such a winding device.

As indicated previously, use is preferably made of a continuous winding with turns, for example adjacent, of a single sheathed textile cord 106a (for example made of aramid) as thread, which forms 2n (n being an integer ≥1) radially superposed corded layers and deposited according to angles +α, −α with the axial direction YY which balance out overall with one and the same number of turns of angle +α and of angle −α, with a being between 0° and 90°. To produce this continuous winding, the mandrel 21 is displaced at the same time, optionally axially along the axis YY and necessarily in rotation about this axis.

As for the sheath of this textile cord 106a, it is, for example, made of a dienic elastomer (e.g. CR) or of a thermoplastic elastomer (e.g. a TPV) and it can, for example, have a thickness of a few tenths of millimeters (this thickness being chosen to be relatively small to guarantee a predetermined density of threads 106a that is sufficient to reinforce the membrane 103, but being able to vary according to the mechanical strength of the textile cord 106b). For a good adhesion of the sheath to the cord 106b, the latter is first surface treated by means of an adhesion activator for example based on an "RFL" resin or a methylol donor (e.g. hexamethoxymelamine or hexamethylenetetramine).

The example of FIG. 4 shows, on a mandrel 21 consisting of two cylindrical sections 21a and 21b linked together by a tapered section 21c, a membrane reinforcement 106' consisting of two corded layers C1 and C2 of the same sheathed textile cord 106a mutually overlapping (i.e. "thread to thread") according to these respective angles +α and −α, and that of FIG. 5 shows, on this same mandrel 21, a reinforcement 106" consisting of corded layers interlaced in the manner of a weave (i.e. with "crossed reinforcements"). In either case, and at the end of the winding of the cord 106a, it is possible to advantageously obtain, at the respective ends 21A and 21B of the mandrel 21, and by the same winding operation, the two rods intended to reinforce the two attachment areas 110 of the membrane 103, these rods thus consisting of this cord 106a (unlike the usual metal rods which are manufactured for the membranes independently of the reinforcement sheets).

As indicated above, the sheath the or each cord 106a includes makes it possible to optimize the direction of winding of the turns for each corded layer C1, C2, through the bonding nature that it confers on this cord 106a. Furthermore, this sheath makes it possible to enhance the bond between the internal 104 and external 105 elastomer layers.

It will be noted that it is possible to obtain, by this technique of winding a previously sheathed continuous textile cord 106a, corded layers C1 and C2 arranged mutually according to patterns totally different from those of FIGS. 4 and 5, provided that this winding forms 2n corded layers C1 and C2 (for example two corded layers, with n=1) with turns that may or may not be adjacent.

Figure 6:
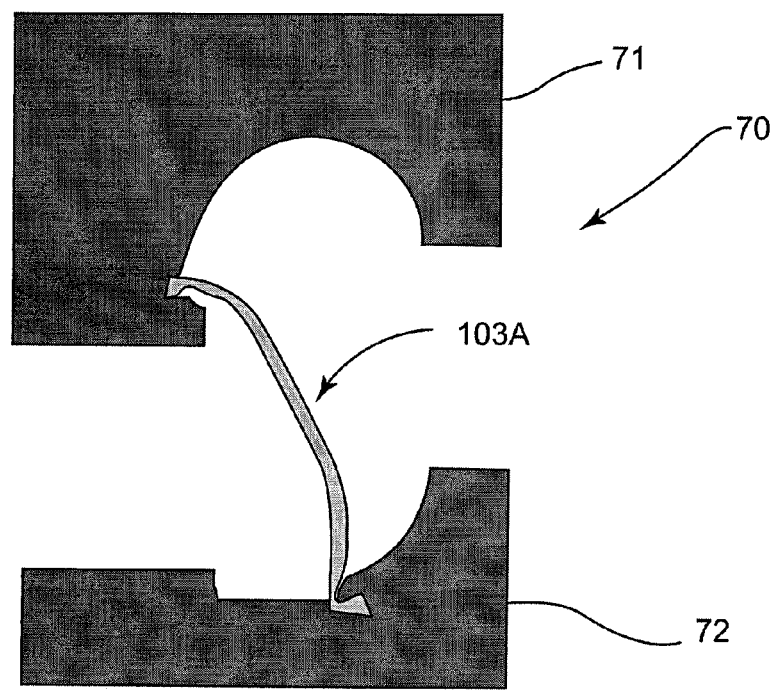
FIG. 6 is a schematic view of a bake mold in the open position receiving this preform, shown in half axial section.
Figure 7:
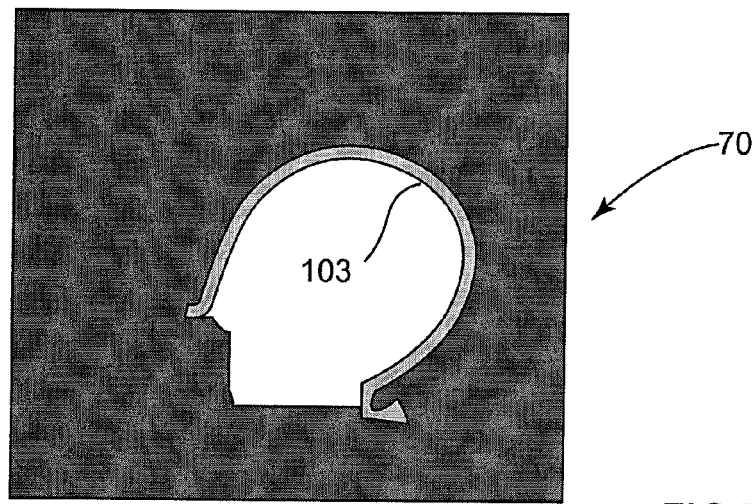
FIG. 7 is a view of the mold of FIG. 6 in the closed position with the membrane being baked, in half axial section.
Figure 8:
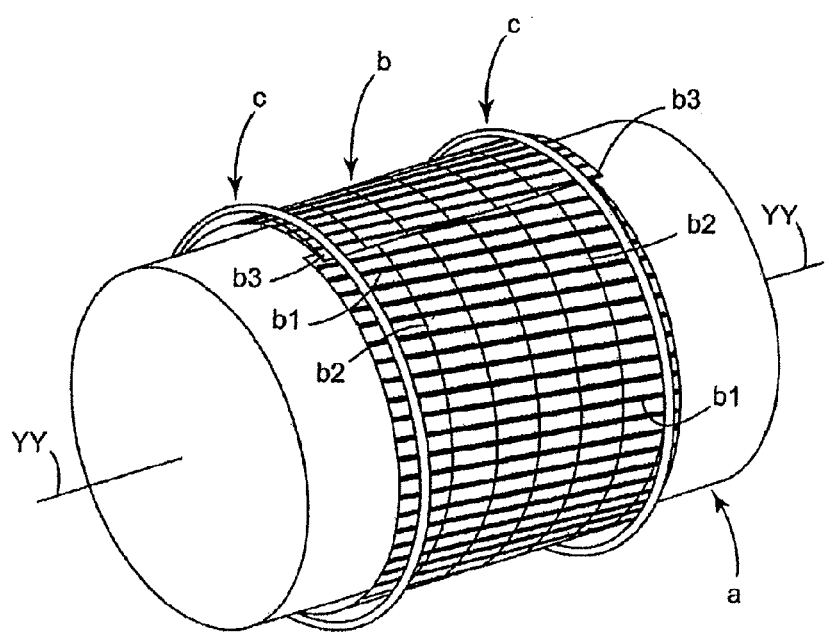
FIG. 8 is a perspective schematic view of a membrane according to the prior art of the type with woven sheets while being formed on a mandrel.

Once the preform 103A has been formed on this mandrel 21, the end rods are brought together so as to form a substantially toroidal bead for this membrane 103, then the duly obtained folded preform 103a is introduced between the two parts 71 and 72 of a mold defining a vulcanization press 70 (see FIG. 6) to cross-link it in appropriate temperature and pressure conditions which are those used in the prior art for the pressurized vulcanization of the secondary suspension air membranes. Following the closure of the mould 70 and the vulcanization of the preform 103A (see FIG. 7), the membrane 103 is obtained as illustrated in FIG. 2.

As indicated previously, it will be noted that the sheathing of the or each textile cord 106*b* makes it possible to minimize the wear-resistance of the membrane 103 in operation despite the preferably adjacent nature of the turns of each corded layer C1, C2, it also being specified that a membrane 103 according to the invention has to be capable of withstanding, in use on a rail vehicle, operating pressures that typically vary between 8 and 12 bar.

It will be noted finally that none of these corded layers C1 and C2 advantageously has the slightest discontinuity between its two attachment areas 110, such as an area of overlap likely to form a line of mechanical weakness for the membrane 103 because of insufficient expansion in this line on inflation of the preform 103A before vulcanization.

The invention claimed is:

1. A substantially toroidal membrane having an axial section substantially "Ω" shaped like a tire, the membrane comprising two attachment areas and at least one corded layer of at least one fabric thread extending from one of said attachment areas to the other one, said at least one corded layer being wound in adjacent turns radially on the outside of a radially internal elastomer layer and on the inside of a radially external elastomer layer which is deposited on the outside of said at least one corded layer,
    wherein said at least one fabric thread of said at least one corded layer is individually sheathed by an elastomer sheath which is extruded around said at least one fabric thread and which is compatible with said internal and external layers,
    and wherein the membrane is able to equip a secondary air suspension of a rail vehicle by being mounted under an auxiliary air tank under a body of the vehicle while communicating with said tank, the membrane being able to withstand operating pressures between 8 and 12 bars in said secondary air suspension,
    and wherein said attachment areas are respectively reinforced by two rods which consist of said at least one fabric thread circumferentially in extension of said at least one corded layer, these rods consisting of a textile cord forming said at least one fabric thread.

2. The membrane according to claim 1, wherein said at least one corded layer has no discontinuity between said attachment areas, having no area of overlap of said at least one layer by said at least one layer extending from one of the attachment areas to the other.

3. The membrane according to claim 1, wherein said at least one corded layer has no weft thread.

4. The membrane according to claim 1, wherein said sheath has a thickness of between 0.1 mm and 1 mm.

5. The membrane according to claim 1, wherein said membrane comprises a number of said corded layers radially superposed, each of which comprises a sheathed textile cord forming said at least one fabric thread and at least partly made of a polyamide selected from aramid or a polyester.

6. The membrane according to claim 5, wherein said membrane comprises a number 2n (n being an integer ≥1) of said corded layers radially superimposed.

7. The membrane according to claim 5, wherein said corded layers are formed by a continuous winding of a single said sheathed textile cord, said winding being defined by two angles +α and −α with the axis of revolution of the membrane, said two angles balancing out overall with a same number of turns of angle +α and of angle −α, with α preferably being between 0° and 90°.

8. The membrane according to claim 7, wherein said corded layers mutually overlap so that the sheathed thread of one of said corded layers entirely covers that of an underlying corded layer, or cross so that the respective sheathed threads of adjacent corded layers are interlaced at regular intervals in the manner of a woven fabric.

9. The membrane according to claim 7, wherein said at least one fabric thread is covered by an adhesion activator at an interface with said sheath that said at least one fabric thread includes, this activator being selected from a resorcinol formaldehyde resin or a methylol donor.

10. The membrane according to claim 1, wherein said sheath consists of a cross-linked elastomer composition which is based on at least one rubber or thermoplastic elastomer and which is different from that of said internal and external layers also based on at least one rubber or thermoplastic elastomer.

11. The membrane according to claim 10, wherein said compositions of sheath and of internal and external layers are based on at least one halogenated or non-halogenated dienic elastomer preferably chosen from the group consisting of polychloroprenes (CR), polybutadienes (BR), styrene-butadiene copolymers (SBR), polyisoprenes (IR), natural rubber (NR), ethylene-propylene-diene terpolymers (EPDM) and their mixtures, these compositions also comprising a reinforcing filler preferably based on carbon black and/or a mineral filler.

12. A secondary air suspension unit of a land or rail vehicle, the vehicle comprising a body supported by at least one wheel train, the secondary suspension comprising:
    an auxiliary air tank mounted under the body, and
    a substantially toroidal membrane which is mounted under the tank by communicating with the tank and which comprises two upper and lower attachment areas mounted against two upper and lower support plates respectively intended to be mounted under this tank and on an emergency suspension attached to the wheel train,
    wherein said membrane is as defined in claim 1.

13. A land or rail vehicle selected from a heavy truck or a passenger wagon, supported by at least one wheel train and equipped with at least one secondary air suspension, wherein said suspension is as defined in claim 12.

14. A method for manufacturing the membrane according to claim 1, wherein the method comprises the following steps:
    (a) winding around a forming mandrel of said at least one thread, previously sheathed, preferably by extrusion, radially on the outside of said internal layer to form said at least one corded layer,
    (b) deposition of said external layer radially on the outside of said at least one thus wound corded layer to obtain a preform of a cross-linkable membrane gripping this mandrel, and
    (c) molding and cross-linking under pressure of this preform in a press.

15. The manufacturing method according to claim 14, wherein the step (a) is implemented by displacing said mandrel optionally in translation and rotation relative to its axis of symmetry to produce said winding, this mandrel preferably having two cylindrical axial end sections linked together by an intermediate section that is, for example, tapered, such that said attachment areas of the preform of the membrane are formed at the respective ends of the mandrel.

16. The manufacturing method according to claim 14, wherein said winding of the step (a) is obtained by a deposition of a single said continuous and sheathed thread, deposited over several, and preferably 2n (n≥1) said corded layers and consisting of a textile cord treated by an adhesion activator and sheathed by a composition preferably based on a halogenated or non-halogenated dienic elastomer.

17. The manufacturing method according to claim 16, wherein it comprises, in the step (a), the winding of said single continuous sheathed thread on said corded layers according to angles +α, −α with the axial direction of said mandrel which balance out overall with one and the same number of turns of angle +α and of angle −α preferably between ±0° and 90°.

* * * * *